United States Patent [19]
Wanger et al.

[11] Patent Number: 5,280,467
[45] Date of Patent: * Jan. 18, 1994

[54] OPTICAL DISK CARTRIDGE ASSEMBLY

[75] Inventors: Mark E. Wanger, Fort Collins; Robert D. Proctor, Loveland; Thomas C. Oliver, Fort Collins, all of Colo.

[73] Assignee: Hewlett-Packard Company, Palo Alto, Calif.

[*] Notice: The portion of the term of this patent subsequent to Jan. 4, 2011 has been disclaimed.

[21] Appl. No.: 697,150

[22] Filed: May 8, 1991

Related U.S. Application Data

[63] Continuation-in-part of Ser. No. 629,305, Dec. 18, 1990.

[51] Int. Cl.$^5$ .............................................. G11B 5/84
[52] U.S. Cl. .................... 369/275.5; 369/291; 369/290
[58] Field of Search ............... 360/133; 369/291, 290, 369/275.5

[56] References Cited
U.S. PATENT DOCUMENTS
4,755,901 7/1988 Fehrenbach et al. ............. 369/291
5,010,536 4/1991 Wanger et al. .................... 369/36

OTHER PUBLICATIONS
Brochure entitled: Lubricomp Internally Lubricated Reinforced Thermoplastics and Fluoropolymer Composites Bulletin 254,688; from LNP, Santa Ana, Calif.
Brochure entitled: A Guide to Statically Conductive and EMI Attenuating Composites Bulletin 223,385; from LNP, Santa Ana, Calif; pp. 5,6,10–13, front, back.

*Primary Examiner*—Paul M. Dzierzynski
*Assistant Examiner*—Don Wong

[57] ABSTRACT

An optical disk cartridge assembly including an optical disk for storing data in machine readable form; a disk casing for rotatably supporting the optical disk; and a reader door slideably mounted on the casing for selectively covering and uncovering an opening therein; the casing having a surface resistivity of less than $10^6$ ohms/sq. Also disclosed is an information storage assembly including such an optical disk cartridge assembly and further including an optical disk drive; a cartridge storage cell and a mechanized cartridge handling assembly for moving the cartridge assembly between the cartridge storage cell and the optical disk drive; each portion of the optical disk drive, cartridge storage cell, and mechanized cartridge handling assembly which comes into contact with the casing having a surface resistivity of less than $10^4$ ohms/sq. Methods for producing the optical disk cartridge assembly and information storage assembly are also disclosed.

10 Claims, 6 Drawing Sheets

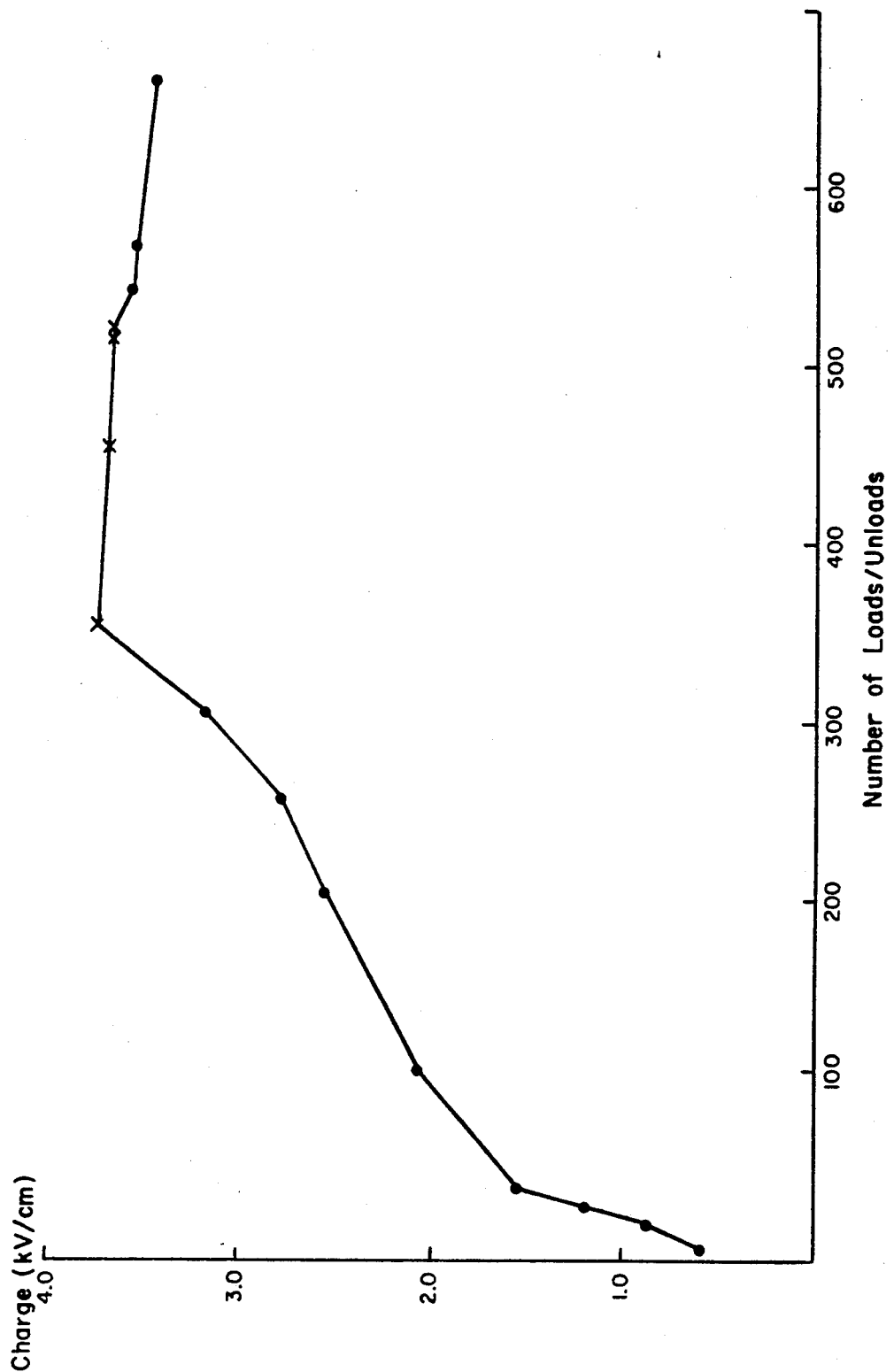

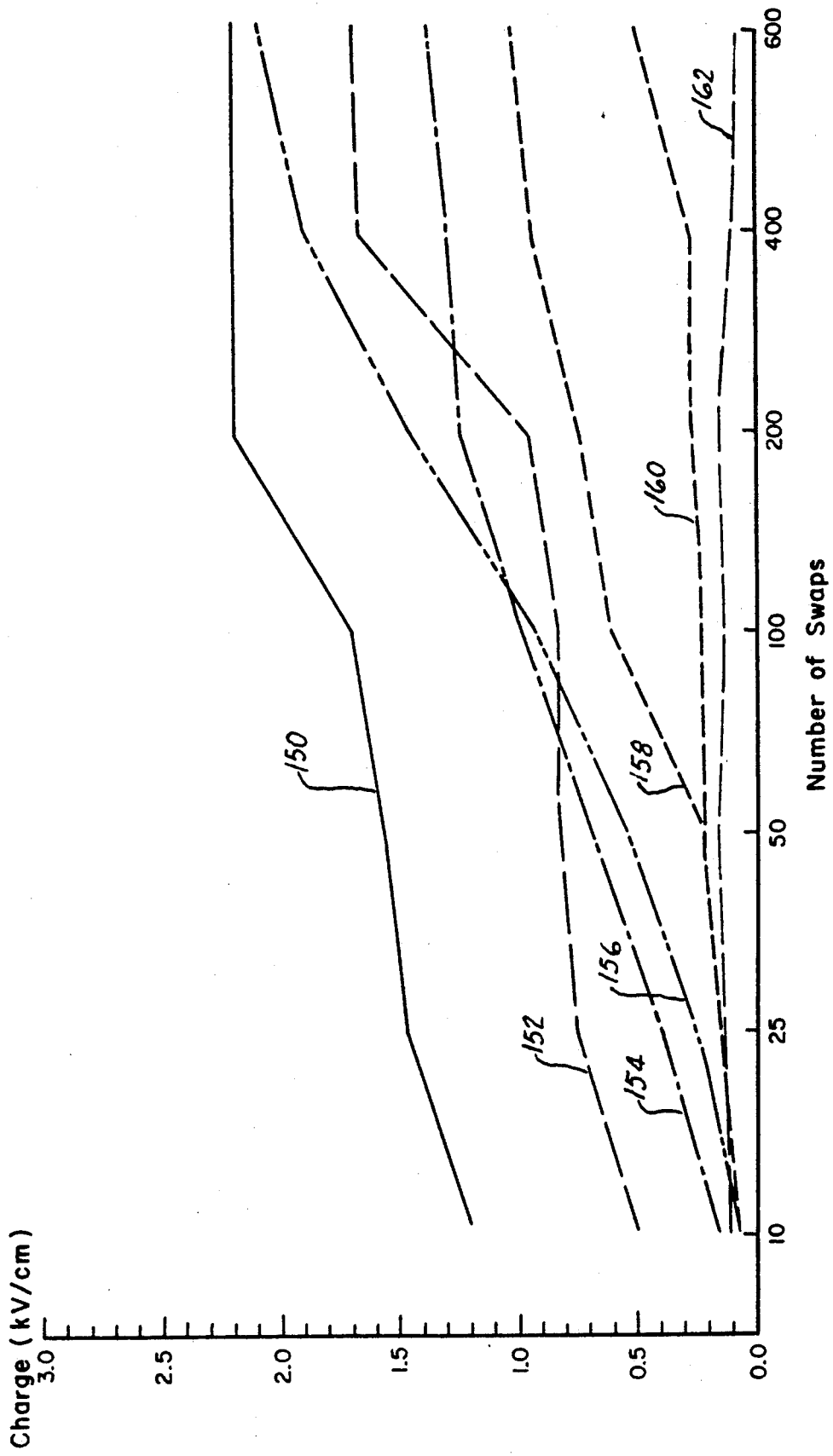

OPTICAL DISK CARTRIDGE ASSEMBLY

BACKGROUND OF THE INVENTION

The present application is a continuation-in-part of applicants' copending U.S. patent application Ser. No. 07/629,305, filed Dec. 18, 1990 for OPTICAL DISK CARTRIDGE ASSEMBLY which is hereby specifically incorporated by reference for all that it discloses.

The present invention relates generally to an optical disk cartridge assembly and, more particularly, to an optical disk cartridge assembly provided with a casing adapted to prevent static discharge to electronic components of an optical disk drive or other electronic components of an autochanger.

An optical disk is a data storage medium which is readable by a laser-based reading device. Optical disks known as "compact disks" or "CDs" have become increasing popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally provided in a cartridge assembly including an optical disk, a parallelepiped-shaped casing in which the disk is rotatably mounted, and a sliding reader door which selectively covers or uncovers an opening in the casing to shield or expose the disk. An optical disk reading/writing device or "optical drive" generally receives a cartridge assembly through a narrow slot provided on the front face of the device. Typically, the cartridge being inserted initially abuttingly engages a biased door in the device and is urged against the door to open it. The cartridge casing then slides over a supporting surface within the reading/writing device as it is pushed into the device. After the cartridge has been loaded into the device, a locating pin within the device is inserted through a transversely extending hole on the cartridge casing to hold the cartridge in a fixed position within the device. Prior to reading/writing, a mechanism within the device slides open the cartridge door to expose the disk to a laser.

Currently, most optical disks are hand-inserted into drives. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk drive.

U.S. patent application Ser. No. 314,012 filed Feb. 22, 1989, of Wanger et al. for CARTRIDGE HANDLING SYSTEM, now U.S. Pat. No. 5,010,536, is hereby specifically incorporated by reference for all that it discloses. This patent discloses a disk storage and retrieval system or "autochanger" wherein the stored disks and an associated disk reader are arranged in a longitudinally extending, two-dimensional array consisting of vertically extending columns and laterally extending rows. The disk handling system of this autochanger is adapted to engage a disk, move it vertically, laterally, and/or longitudinally and then release it in order to remove it from storage, move it into aligned relationship with the disk reader, and insert it into the disk reader. The disk handling system is also adapted to flip the disk to reverse the side thereof which will be positioned in readable relationship with a reader. The system is further adapted to reorient a disk at the time it is initially inserted into the system by an operator.

Cartridge casings are subject to wear as a result of surface contact made with other objects. Wear rate is generally defined as the volumetric loss of material over a unit time. A "wear factor" may be defined in terms of parameters which affect wear rate. "Wear factor", as used herein, is defined as follows:

$K$ (wear factor) $= W/FVT$, where:
$W$ = volume wear (in$^3$)
$F$ = force (lb)
$V$ = velocity (ft/min)
$T$ = elapsed time (hr)

The wear factors for various materials as specified herein are based upon wear factor measurements made in accordance with a procedure described at p. 25 of a brochure entitled: *LUBRICOMP INTERNALLY LUBRICATED REINFORCED THERMOPLASTICS AND FLUOROPOLYMER COMPOSITES* Bulletin 254,688, which is available from LNP (a business unit of ICI Americas, Inc.), 1831 E. Carnegie, Santa Ana, Calif., 92705, which is hereby specifically incorporated by reference for all that it discloses.

Currently, most optical disk casings are constructed from a thermoplastic material such as polycarbonate which has a wear factor "K" on the order of $2500 \times 10^{-10}$ in$^3$-min/ft-lb-hr. It is applicants' discovery that such currently used casing material creates a problem in optical disk cartridge assemblies which are used in autochangers such as described in U.S. patent application Ser. No. 314,012 and such as are currently sold under the product designation C1710 by Hewlett-Packard Company having a business address of 3000 Hanover Street, Palo Alto, Calif., 94304. Applicants have discovered that in such autochangers abrasive wear of cartridge casings causes a build up of fine particles in the autochanger optical drives which contaminates the surface of optical disks, thus effecting the reading or writing operation being performed, and which also may cause jamming of the cartridge door and jamming of other malfunctions of the optical drives or various other mechanical assemblies of the autochanger. Applicants have discovered that this particle build up is produced by frictional engagement of the cartridge with various surfaces of cartridge storage cells, the optical drive(s), and the cartridge handling mechanism of the autochanger, as well as by the sliding movement of the reader doors of cartridges. These problems associated with abrasive wear of cartridges used in autochangers were to applicants' knowledge not know in the art prior to applicants' discovery. Applicants' U.S. patent application Ser. No. 07/629,305, filed Dec. 18, 1990 for OP- TICAL DISK CARTRIDGE ASSEMBLY describes a low wear cartridge assembly and is hereby specifically incorporated by reference for all that it discloses.

Applicants have also discovered another problem associated with the use of conventional optical disk cartridges in autochangers. When optical cartridges are handled by the various mechanical assemblies of an autochanger they rub against other materials and, through triboelectric effects, gather electrostatic charge. In a typical autochanger application a single cartridge may be "swapped" (i.e. removed from its storage area, loaded into an optical drive, removed from the optical drive and returned to its storage area) several hundred times in a few hours of operation. The resulting static charge which is retained on the cartridge may discharge into sensitive electronic components of the optical drive or other portions of the autochanger producing a system malfunction. If the static discharge is sufficiently great it may cause a complete component failure. Such autochanger problems associated with the build up of static charge on optical disk cartridges were to applicants' knowledge not known in the art prior to applicants' discovery.

Currently most optical disks have casings constructed from polycarbonate or similar thermoplastic material having a surface resistivity of approximately $10^6$ ohms/sq. "Surface resistivity" as used herein means surface resistivity as defined and measured by ASTM test method D257.

SUMMARY OF THE INVENTION

The present invention is directed to solving problems of autochanger malfunction.

It is applicants' discovery that one cause of autochanger malfunction is the build up of particulate matter within autochanger drives and other system components and that the cause of this particulate matter build up is abrasive contact between the surfaces of currently used optical disk cartridge casings and the reader doors of the cartridges and also the abrasive contact between the cartridge casings and the various surfaces of the autochanger system with which the cartridges make contact.

It is applicants' discovery that another cause of autochanger malfunction is the build up of static charge on the casings of convention optical disk cartridges as a result of rubbing contact between the casings and various surfaces of the autochanger during multiple cartridge swaps.

Applicants have solved the problem of particle build up by providing a cartridge casing which has a wear factor which is sufficiently low so as to avoid particle build up of a magnitude which would significantly adversely effect the operation of an autochanger.

Applicants have solved the problem of electrostatic build up by providing a cartridge casing having a sufficiently low surface resistivity to allow dissipation of static electricity to prevent damaging static discharge into sensitive electronic components.

In one embodiment of the invention applicants have solved both problems with a relative inexpensive cartridge casing which is abrasion resistant and which also has a relatively low surface conductivity.

Applicants have solved the problem of electrostatic build up in a second manner by constructing the various portions of the autochanger which come into contact with cartridges from materials having a relatively low surface resistivities.

Thus, the invention may comprise an optical disk cartridge assembly which includes an optical disk for storing data in machine readable form, a casing for rotatably supporting the optical disk and for shielding the optical disk from physical contact with other objects and a casing door which is slideably mounted on the casing for selectively covering and uncovering a casing opening. The casing is constructed from material having a surface resistivity of less than $10^6$ ohms/sq so as to prevent collection of a static charge sufficient to cause malfunctions in autochanger electronic components.

In one embodiment of the invention the casing has a wear factor, associated with sliding contact with the casing door, of less than $100 \times 10^{-10}$ in$^3$-min/ft-lb-hr so as to prevent abrasive cartridge wear and resulting autochanger malfunctions associated with particle build up. In such an embodiment the casing may be constructed from a thermoplastic material impregnated with carbon and may be at least 30% by weight carbon.

The invention may also comprise an information storage assembly. The storage assembly includes an optical disk cartridge assembly comprising an optical disk, a casing and a casing door; an optical disk reading device; a cartridge storage cell; and a mechanized cartridge handling assembly for engaging the cartridge assembly and for moving the cartridge assembly between the cartridge storage cell and the optical disk reading device. Each portion of the optical disk reading device, the cartridge storage cell, and the mechanized cartridge handling assembly which comes into contact with the cartridge casing has a surface resistivity of less than $10^4$ ohms/sq. In such an assembly the various components which come into contact with an optical disk cartridge bleed off static charge so as to prevent an accumulation of charge sufficient to cause problems with storage assembly electronics. To further reduce static charge on the optical disk cartridges used in the storage assembly the cartridge casings may be constructed from material having a surface resistivity of less than $10^6$ ohms/sq.

The invention may also include methods of making such optical disk cartridge assemblies and information storage assemblies described above.

BRIEF DESCRIPTION OF THE DRAWINGS

Illustrative and presently preferred embodiments of the invention are shown in the accompanying drawings in which:

FIG. 6 is a graph illustrating static charge build-up and points of static discharge observed in a bench test using a conventional optical disk cartridge assembly.

FIG. 7 is a graph illustrating static charge build-up observed in a controlled environment using optical disk cartridges constructed from various materials of different surface resistivities.

DETAILED DESCRIPTION OF THE PREFERRED EMBODIMENTS OF THE INVENTION

Autochanger Assembly

Figure 1:
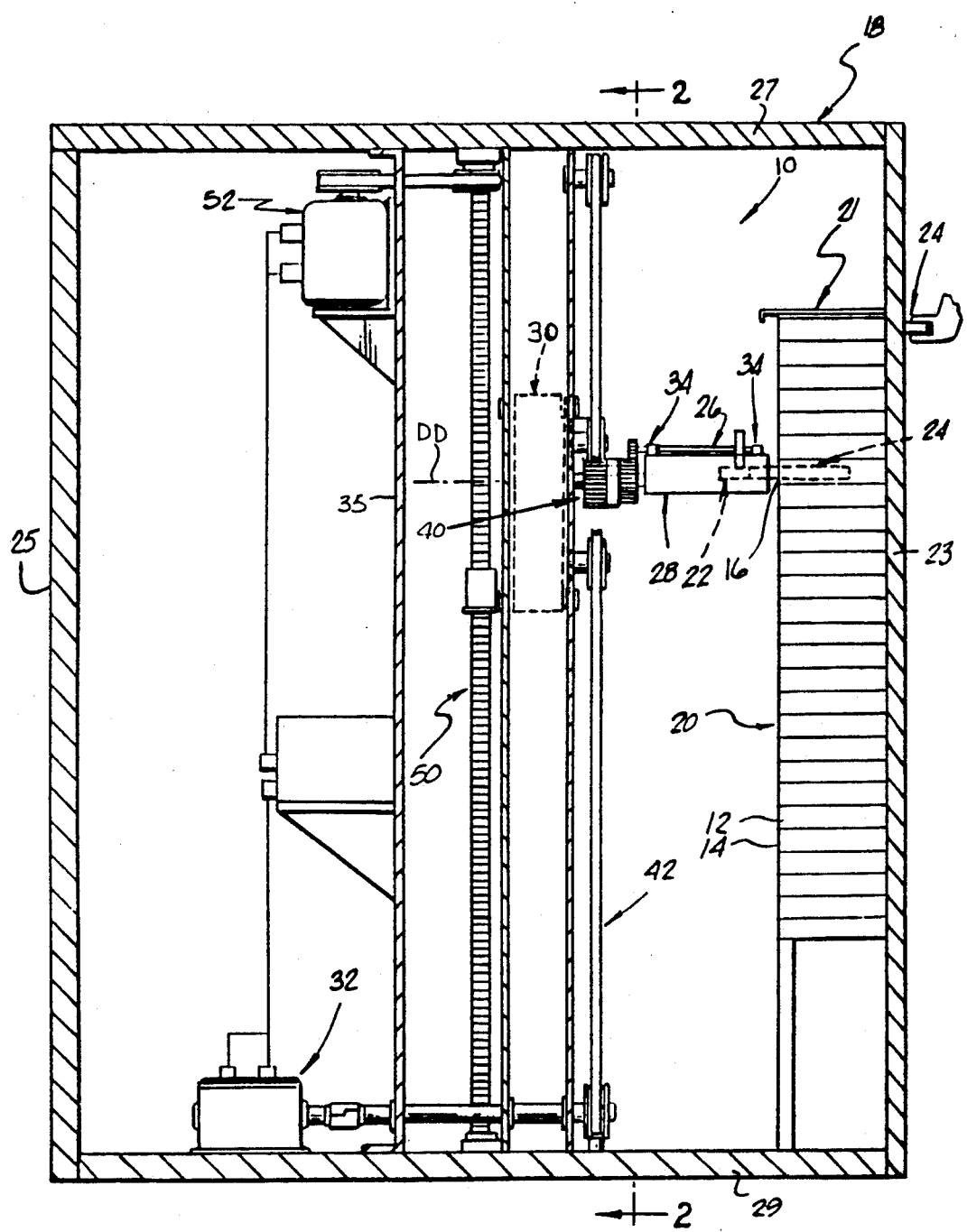
FIG. 1 is a schematic side elevation view of an optical disk cartridge handling system.
Figure 2:
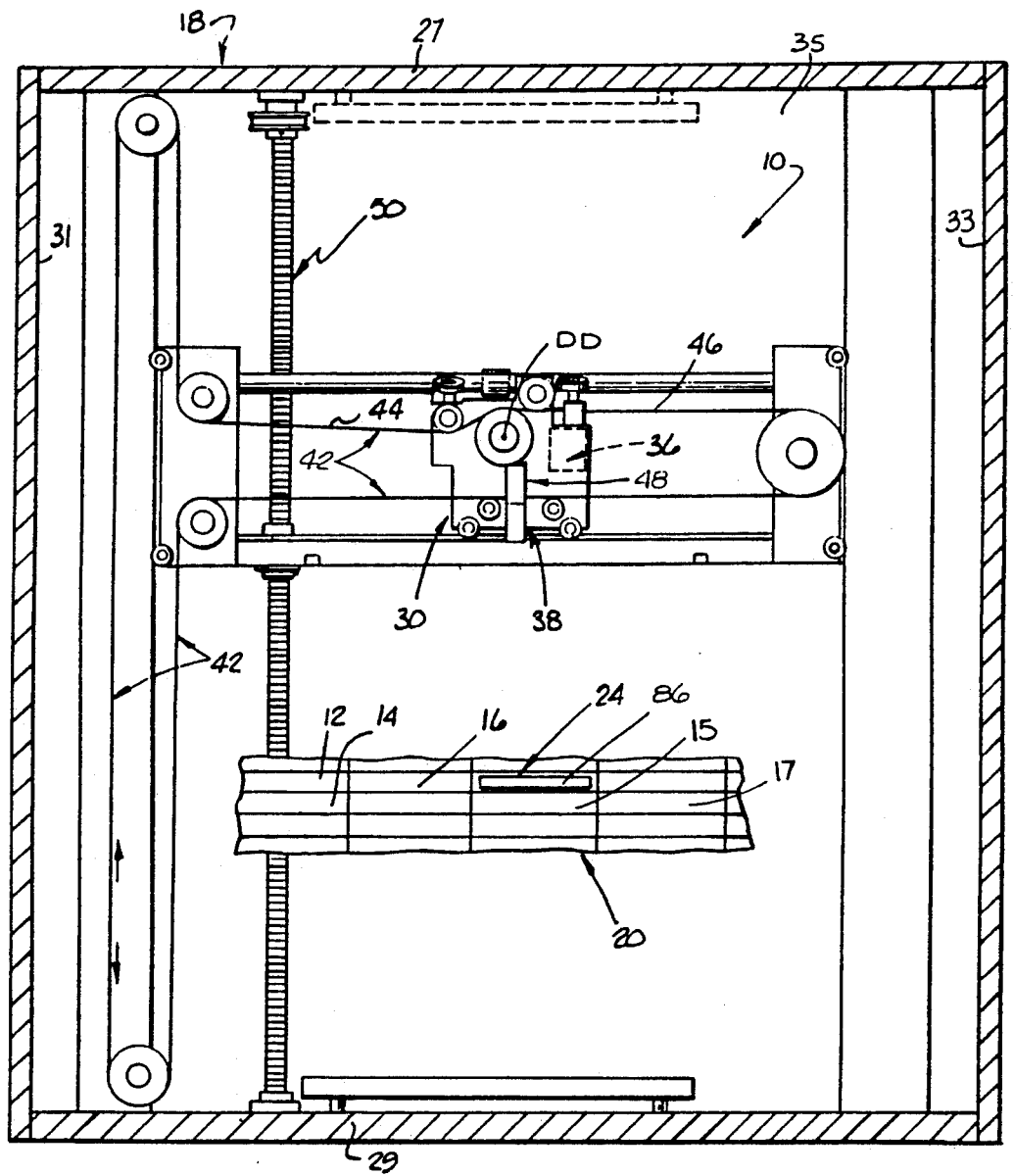
FIG. 2 is a schematic front elevation view of an optical disk cartridge handling system.

FIGS. 1 and 2 illustrate an optical disk cartridge handling system 10 for use in association with a plurality of longitudinally extending, rearwardly opening, cartridge holding units which include storage cells 12, 14, 16, etc. and disk reading/writing devices or optical drives 15, 17 arranged in a laterally and vertically extending holding unit array 20. The handling system 10 and holding unit array 20, sometimes referred to herein collectively as an "autochanger assembly" or simply "autochanger", is provided within a closed housing 18 having a front wall 23, a back wall 25, a top wall 27, a bottom wall 29, a left lateral side wall 31, and a right lateral side wall 33. An intermediate housing wall 35 may be positioned between the front and back walls for separating electronic and motor components from other components of the apparatus.

The handling system 10 may comprise an insertion means 21 for receiving a cartridge 24 which is hand-inserted by a human operator with a first end of the cartridge positioned forwardly. The insertion means longitudinally and rotationally displaces the cartridge so as to present the cartridge to a cartridge engaging means with the first end of the cartridge positioned towards the rear of the housing.

A cartridge engaging means 22 is provided for engaging an exposed end portion of a cartridge positioned in the insertion means 21 or in another aligned holding unit, e.g. 12, 14, 16.

A longitudinal displacement means 26 is operatively associated with the engaging means for longitudinally displacing a cartridge 24 engaged by the engaging means 22.

A flipping means 28 is operatively associated with the engaging means 22 and is used for invertingly rotating a cartridge engaged by the engaging means about a longitudinally extending flip axis DD.

A lateral displacement means 30 is operatively associated with the engaging means 22 for laterally displacing a cartridge 24 engaged by the engaging means.

A rotatable first drive means 32 is drivingly linked to the longitudinal displacement means 26, the flipping means 28, and the lateral displacement means 30 for providing driving force thereto.

Stop means 34 may be provided which limit the movement of the longitudinal displacement means 26.

A flip latch means 36 is provided which has a latched state and an unlatched state and which is operatively associated with the flipping means 28 for preventing rotation thereof when the flip latch means 36 is in the latched state.

A translation latch means 38 is provided which has a latched state and an unlatched state. The translation latch means is operatively associated with the lateral displacement means 30 for preventing lateral displacement thereof when the translation latch means is in the latched state.

The cartridge handling system 10 has a longitudinally displacing operating state wherein the stop means 34 is in disengaged relationship with the longitudinal displacement means 26; the flip latch means 36 is in its latched state; and the translation latch means 38 is in its latched state. The cartridge handling system 10 comprises a rotatably flipping operating state wherein the stop means 34 is in engaged relationship with the longitudinal displacement means 26; the flip latch means 36 is in its unlatched state; and the translation latch means 38 is in its latched state. The cartridge handling system 10 also comprises a laterally displacing operating state wherein the translation latch means 38 is in its unlatched state.

A first gear means 40 (22, 36, 4170, 4172) is provided which is mounted in rotationally displaceable relationship with the lateral displacement means 30 and which is drivingly linked to the longitudinal displacement means 26 and the flipping means 28.

A continuous drive belt means 42 is provided which is continuously nonslippingly engaged with the first gear means 40 for drivingly linking the first gear means 40 with the first drive means 32. The continuous belt means may comprise a first portion 44 extending in a first lateral direction from the first gear means 40 and a second portion 46 extending in a second lateral direction from the first gear means. The lateral displacement means 30 is laterally displaceable through movement of the continuous belt means 42 when the first gear means 40 is locked against rotation.

A gear lock means 48 having a locked state and an unlocked state is provided which is operatively associated with the first gear means 40. The gear lock means 48 prevents rotation of the first gear means 40 when the gear lock means is in its locked state. The cartridge handling system 10 is constructed and arranged such that the gear lock means 48 is in its locked state when the translation latch means 38 is in its unlatched state, and such that the gear lock means 48 is in its unlocked state when the translation latch means 38 is in its latched state.

The optical disk cartridge handling system 10 also comprises a vertical displacement means 50 for vertically displacing a cartridge 24 engaged by the cartridge engaging means 22. A second drive means 52 is operatively associated with the vertical displacement means 50 for providing driving force thereto.

In one embodiment of the invention each portion of each optical disk drive 15, 17 and each portion of each cartridge storage cell 12, 14, etc. and each portion of the mechanized cartridge handling system 10 which comes into contact with a cartridge casing 72 has a surface resistivity of less than $10^4$ ohms/sq and preferably less than $10^2$ ohms/sq. By constructing these autochanger components from materials with relatively low surface resistivities the static charge which builds up on the surface of an optical disk cartridge during multiple swap operations is significantly reduced over that experienced when components are constructed from conventional materials. As a result the risk of autochanger malfunction associated with static discharge from optical disk cartridges to system electronic components is significantly reduced. Suitable low surface resistivity materials include stainless steel and thermoplastics such as polycarbonate, polyethylene, and polypropylene which have been impregnated with carbon powder, e.g. 8–12% carbon powder or 20–30% pitch carbon fiber. Such impregnated thermoplastics with desired surface resistivities are commercially available form LNP Engineering Plastics, 1831 E. Carnegie, Santa Ana, Calif., 92705.

Optical Disk Cartridge Assembly

Figure 3:
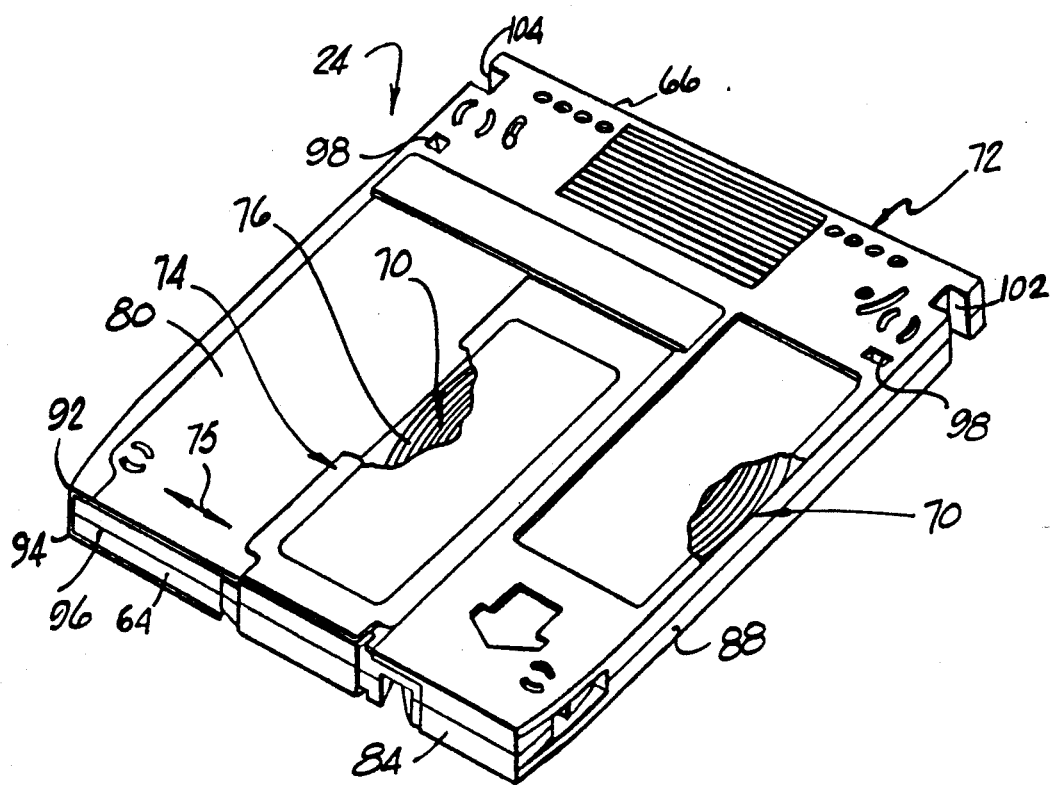
FIG. 3 is a perspective view of an optical disk cartridge assembly.

An optical disk cartridge assembly 24 is shown in FIG. 3. Cartridge assembly 24 has a rear end portion 64 which is adapted to be inserted into an optical disk reading device, e.g. 15, and has a forward end portion 66 which is adapted to ordinarily be grasped by a human operator for inserting and removing the cartridge from an optical disk reading device.

The cartridge assembly includes an optical disk 70, a casing 72 within which the optical disk is rotatably mounted, and a reader door 74 which is slideably mounted on the casing 72. The reader door is slidingly displaceable, as indicated at 75 to cover or uncover an opening 76 in the casing so as to enable a reading or writing laser beam within an optical drive to impinge upon the optical disk. The reader door is biased in the closed position and is openingly displaceable by a mechanism (not shown) within an optical drive. The reader door may be constructed from steel or other material and may be fabricated and mounted on the casing by conventional techniques known in the art.

The cartridge casing 72 is generally parallelepiped shaped having generally flat top 80, bottom 82, rear 84, front 86, and lateral 88, 90 exterior surfaces. The casing may be constructed from a separate top section 92 and bottom section 94 which may be individually injection molded using conventional molding techniques well known in the art. The top and bottom sections meet at seam line 96 and are held together as by screws (not shown) or other conventional means well known in the art. The top and bottom sections 92, 94 define an enclosure within which the optical disk 70 is conventionally rotatably mounted.

One or more holes 98 are provided which extend transversely through the casing and which are adapted to receive a pin portion 118 of the optical drive for registering the cartridge with the drive as described in further detail below. The casing is also provided with vertically extending channels 102, 104 in its lateral side-walls near the front end 66 thereof for enabling the cartridge to be engaged and moved by the cartridge handling system 10.

Figure 4:
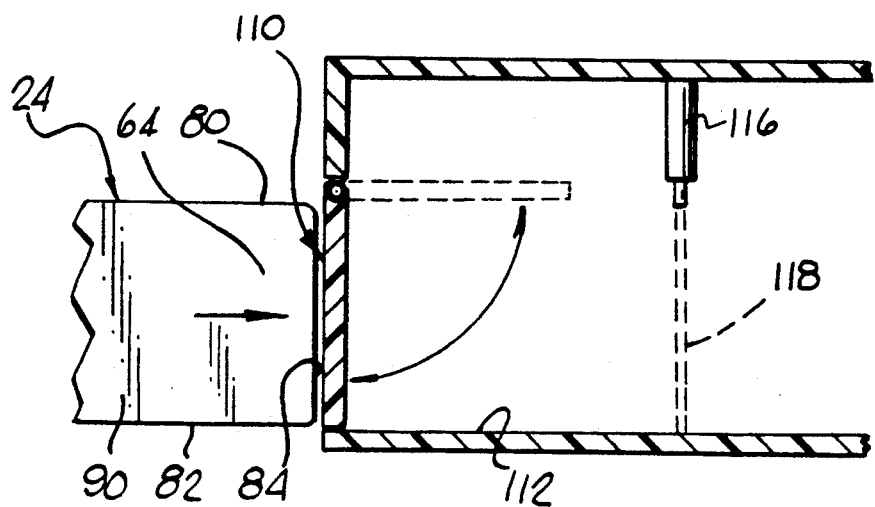
FIG. 4 is a schematic, cut away, side elevation view of a portion of an optical disk reading apparatus and optical disk cartridge assembly.

FIG. 4 schematically illustrates portions of an optical disk drive 15 (which may be a Sony Model SMO-D501-01 Optical Disk Drive which is commercially available from Hewlett-Packard Company having a business address of 3000 Hanover Street, Palo Alto, Calif., 94304. The drive 15 comprises a spring biased, normally vertically disposed, hinged door 110 which is adapted to be urged into the open position illustrated in phantom in FIG. 4 by the rear end 84 of a cartridge casing during insertion of the cartridge in the drive 15. The drive door 110 is typically constructed from polycarbonate. One or more horizontal support rails 112 are provided within the drive for slideably engaging and supporting the cartridge casing at the bottom surface 82 thereof. The support rails 112 are typically constructed from steel. At least one vertically extendable registration pin assembly 116 is provided within the drive which is adapted to extend a registration pin 118 from a raised position, as shown in solid lines, to a lowered position, as shown in phantom. The pin 118 is extended after the cartridge is inserted into the optical drive and passes through hole 98 in the cartridge casing so as to hold the cartridge in a fixed registration position with the optical drive. The pin 118 sometimes makes contact with the casing surface defining hole 98 as it is inserted.

During initial insertion of an optical disk cartridge assembly into the disk handling apparatus 10, the cartridge casing makes contact at the rear and bottom surface portions thereof with portions of the insertion apparatus 21 which may comprises parts made primarily from polyethersulfone (PES). The cartridge 24 is subsequently removed from the insertion apparatus by engagement of the cartridge by fingers of engagement means 22 at its vertical channel portions 102, 103 and is sliding moved across a horizontal surface of longitudinal displacement means 26. Both the fingers of engagement means 22 and the horizontal surface of displacement means 26 may be constructed from nylon. The cartridge 26 is next slidingly inserted into a drive, e.g. 15, or a storage cell, e.g. 14. The storage cells may have cartridge support surfaces constructed from polycarbonate.

Figure 5:
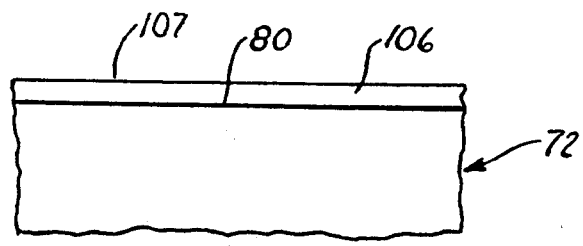
FIG. 5 is a side elevation view of a portion of an optical disk cartridge assembly casing.

In order to reduce the collection of static charge on the surface of a cartridge casing 72 during autochanger operation to substantially reduce the risk of autochanger malfunction as a result of static discharge, the cartridge casing is constructed from a material having a surface resistivity of less than $10^6$ ohms/sq and preferably less than $10^4$ ohms/sq. In a preferred embodiment of the invention cartridge casings are constructed from a single homogeneous material having such relatively low surface resistivity. However as an alternative the cartridge casing 72 may be constructed from a main body of homogeneous material 130, FIG. 5, which may be a conventional relatively high surface resistivity thermoplastic material which is covered with a coating of a second material (such as that sold under the product designation Staticide by ACL Inc. of Elksgrove Ill., 60007) which has a relatively low surface resistivity. This alternative construction may be employed for converting existing conventional optical disk cartridges having high surface resistivities into improved cartridges having relatively low surface resistivities. However a draw back with this latter casing construction is that such a surface coating will typically wear off after prolonged use of a cartridge.

The results of a bench test conducted to determine the relative amount of static build up on a conventional cartridge used in an autochanger of the type described above is illustrated in FIG. 6. On that graph, dots indicate points at which static charge was measured and "X's" indicate points at which static discharge occurred which resulted in autochanger malfunction. The particular casing material used in this bench test was ABS plastic having a surface resistivity of approximately $10^{17}$ ohms/sq. This graph clearly demonstrates the problem of static discharge which is experienced in autochangers using conventional optical disk cartridges.

The results of tests performed under environmentally controlled conditions (25° C., 10% relative humidity) using the same type autochanger assembly as that used for the bench test of FIG. 6 is illustrated in FIG. 7. The graph shown in FIG. 6 illustrates the static charge build-up in cartridges of the type described with reference to FIG. 3 which are constructed from materials having different surface resistivities. Plot 150 is for a cartridge casing constructed from ABS plastic having a surface resistivity of approximately $10^{17}$ ohms/sq. Plot 152 is for a cartridge casing constructed from unimpregnated poycarbonate plastic having a surface resistivity of approximately $10^{15}$ ohms/sq. Plot 154 is for a cartridge casing constructed from 5% carbon fiber impregnated poycarbonate plastic having a surface resistivity of approximately $10^{11}$ ohms/sq. Plot 156 is for a cartridge casing constructed from 3% carbon impregnated poycarbonate plastic having a surface resistivity of approximately $10^3$ ohms/sq. Plot 158 is for a cartridge casing constructed from a 3% stainless steel impregnated poycarbonate plastic having a surface resistivity of approximately $10^9$ ohms/sq Plot 160 is for a cartridge casing constructed from a 10% carbon impregnated poycarbonate plastic having a surface resistivity of approximately $10^6$ ohms/sq. Plot 162 is for a cartridge casing constructed from a 8% stainless steel impregnated poycarbonate plastic having a surface resistivity of approximately $10^6$ ohms/sq. This graph clearly demonstrates that there is a close inverse correlation between surface resistivity of a cartridge and the amount of static charge which a cartridge accumulates during use in an autochanger. Applicants have discovered that by preventing accumulation of static charge on cartridges in excess of about 1.0 kv/cm and most preferably 0.5 kv/cm, as measured under the test conditions of FIG. 7, that autochanger failures associated with static discharge from cartridges can be avoided. Accordingly applicants have determined that by constructing a cartridge casing of material having relatively low surface resistivity, preferably less than $10^6$ and most preferably less than $10^4$ ohms/sq, that most problems associated with static discharge from cartridges in autochanger applications may be avoided.

In one preferred embodiment the material from which the cartridge casing is constructed, in addition to having a low surface resistivity also has a relatively low wear factor—a wear factor of preferably less than $100 \times 10^{-10}$ in$^3$-min/ft-lb-hr and most preferably less than $10 \times 10^{-10}$ in$^3$-min/ft-lb-hr with respect to the reader door.

The casing 72 may be constructed from a thermoplastic material impregnated with one or more of: stainless steel fibers, aluminum fibers, metallized glass fibers, metal powders, aluminum flakes, or, and most preferably carbon powder or carbon fiber. The thermoplastic material may be, for example, ABS plastic, SAN plastic, or, and most preferably, polycarbonate plastic.

The presently most preferred casing material is polycarbonate impregnated with carbon. Levels of carbon of at least 7% and most preferably at least 10% by weight will typically produce a sufficiently low surface resistivity to avoid static discharge problems in autochanger applications. A carbon level of 30% by weight in a poycarbonate matrix will, in addition to providing an extremely low surface resistivity, provide a wear factor of less than $100 \times 10^{-10}$ in$^3$-min/ft-lb-hr.

Materials of the compositions described above are commercially available from a number of sources, including LNP Engineering Plastics, 1831 E. Carnegie, Santa Ana, Calif., 92705.

By using abrasion resistent casing materials as specifically described above, the resulting optical disk cartridge may typically be loaded into an autochanger optical disk drive in excess of 100,000 times before a drive jamming failure caused by casing wear is encountered. Optical disk cartridges using conventional casing material typically cause drive jamming due to casing wear after less than 5,000 drive loads. Similarly by using casing materials having a surface resistivity of less than $10^6$ ohms/sq an optical disk may be expected to produce no static discharges sufficient to cause autochanger malfunction. Conventional cartridges have been found to typically cause autochanger malfunctions due to static discharge after a few hundred cartridge swaps.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An information storage assembly comprising:
   a) an optical disk cartridge assembly comprising:
      i) optical disk means for storing data thereon in machine readable form;
      ii) casing means for rotatably supporting said optical disk means therewithin and for shielding said optical disk means from physical contact with other objects; and
      iii) door means slideably mounted on said casing means for selectively covering and uncovering an opening therein;
   b) an optical disk reading means for slideably receiving said optical disk cartridge assembly therein and for reading data from said optical disk means;
   c) cartridge storage cell means for storing said optical disk cartridge assembly during periods when said cartridge assembly is not inserted in said optical disk reading means;
   d) mechanized cartridge handling means for engaging said cartridge assembly and for moving said cartridge assembly between said cartridge storage cell means and said optical disk reading means;
   each portion of said optical disk reading means, cartridge storage cell means, and mechanized cartridge handling means which comes into contact with said casing means having a surface resistivity of less than $10^4$ ohms/sq.

2. The invention of claim 1, each portion of said optical disk reading means, cartridge storage cell means, and mechanized cartridge handling means which comes into contact with said casing means having a surface resistivity of less than $10^2$ ohms/sq.

3. The invention of claim 1 said casing means having a wear factor associated with sliding contact with said door means and with sliding contact with any engaged surface of said optical disk reading means, said cartridge storage cell means, and said mechanized cartridge handling means of less than $350 \times 10^{-10}$ in$^3$-min/ft-lb-hr. and said casing means having a surface resistivity of less than $10^6$ ohms/sq.

4. The invention of claim 3, said casing means being constructed from a thermoplastic material impregnated with carbon.

5. The invention of claim 4, said thermoplastic material being polycarbonate, the amount of impregnating carbon being at least 30% by weight.

6. The invention of claim 4 wherein said step of constructing a cartridge casing comprises using a casing material which is at least 10% by weight carbon.

7. The invention of claim 4 wherein said step of constructing a cartridge casing comprises using a casing material which is at least 30% by weight carbon.

8. A method of constructing an information storage assembly of the type including: a) an optical disk cartridge assembly comprising: i) optical disk means for storing data thereon in machine readable form; ii) casing means for rotatably supporting said optical disk means therewithin and for shielding said optical disk means from physical contact with other objects; and iii) door means slideably mounted on said casing means for selectively covering and uncovering an opening therein; b) an optical disk reading means for slideably receiving said optical disk cartridge assembly therein and for reading data from said optical disk means; c) cartridge storage cell means for storing said optical disk cartridge assembly during periods when said cartridge assembly is not inserted in said optical disk reading means; d) mechanized cartridge handling means for engaging said cartridge assembly and for moving said cartridge assembly between said cartridge storage cell means and said optical disk reading means comprising the steps of:

a) constructing each portion of said optical disk reading means which comes into contact with said casing means from a material having a surface resistivity of less than $10^4$ ohms/sq;

b) constructing each portion of said cartridge storage cell means which comes into contact with said casing means from a material having a surface resistivity of less than $10^4$ ohms/sq;

c) constructing each portion of said mechanized cartridge handling means which comes into contact with said casing means from a material having a surface resistivity of less than $10^4$ ohms/sq.

9. The method of claim 8 comprising:

constructing each portion of said optical disk reading means, cartridge storage cell means, and mechanized cartridge handling means which comes into contact with said casing means from a material having a surface resistivity of less than $10^2$ ohms/sq.

10. The invention of claim 9 comprising constructing said casing means from a material having a wear factor associated with sliding contact with said door means and with sliding contact with any engaged surface of said optical disk reading means, said cartridge storage cell means, and said mechanized cartridge handling means of less than $350 \times 10^{-10}$ in$^3$-min/ft-lb-hr and having a surface resistivity of less than $10^6$ ohms/sq.

* * * * *